US005140347A

United States Patent [19]

Matsuda et al.

[11] Patent Number: 5,140,347

[45] Date of Patent: Aug. 18, 1992

[54] ELECTROSTATIC RECORDING APPARATUS

[75] Inventors: Naoya Matsuda; Kiyoshi Nagahata, both of Tokyo, Japan

[73] Assignee: Nippon Steel Corporation, Tokyo, Japan

[21] Appl. No.: 545,614

[22] Filed: Jun. 29, 1990

[30] Foreign Application Priority Data

Jun. 30, 1989 [JP] Japan ........................ 1-169048

[51] Int. Cl.[5] ........................ G01D 15/06

[52] U.S. Cl. ........................ 346/155

[58] Field of Search ........................ 346/155

[56] References Cited

U.S. PATENT DOCUMENTS

| | | | |
|---|---|---|---|
| 3,624,661 | 11/1971 | Shebanow et al. | 346/155 |
| 3,653,065 | 3/1972 | Brown, Jr. . | |
| 3,886,563 | 5/1975 | Forgo et al. | 346/155 |
| 4,400,709 | 8/1983 | de Kermadec et al. | 346/155 X |
| 4,521,790 | 6/1985 | Allard | 346/155 X |

FOREIGN PATENT DOCUMENTS

| | | |
|---|---|---|
| 53-20929 | 2/1978 | Japan . |
| 61-10466 | 4/1985 | Japan . |

*Primary Examiner*—George H. Miller, Jr.
*Attorney, Agent, or Firm*—Pollock, Vande Sande & Priddy

[57] ABSTRACT

An electrostatic recording apparatus for recording an image represented by a series of binary signals delivered by an image signal source on a recording medium which is moved relative to the apparatus comprises a recording head including a multiplicity of thin strip-shaped recording electrodes having end surfaces substantially aligned on a line substantially perpendicular to a direction of the relative movement of the recording medium, each of the end surfaces having a thickness measured in a direction substantially perpendicular to the line which is smaller than its width measured in a direction parallel to the line, and image signal applying device for sequentially applying a series of binary signals delivered by the image signal source and representative of the image, to the multiplicity of recording electrodes to form the image on the recording medium by dots produced thereon corresponding to the binary signal in such a manner that each of the binary signals is applied equally at a plurality of times to one of the recording electrodes while moving the recording medium relative to the recording head thereby forming one dot corresponding to that binary signal.

4 Claims, 5 Drawing Sheets

ELECTROSTATIC RECORDING APPARATUS

BACKGROUND OF THE INVENTION

1. Field of the Invention

The present invention relates to an electrostatic recording apparatus for recording an image on a recording medium by using an output signal delivered out of a computer or an electrographic.

2. Description of the Related Art

Known as an apparatus, wherein an image carrying output signal from a computer or an electrographic is used to form an electrostatic latent image at a high rate on a recording medium having a charge holding layer and an electrically conductive layer and the electrostatic latent image is developed with toner into a visible image, are electrostatic recording apparatuses with multi-electrode recording head as disclosed in, for example, JP-A-53-20929, JP-A-61-10466 and U.S. Pat. No. 3,653,065. A recording head of the electrostatic recording apparatus disclosed in JP-A-61-10466 has a great number of electrically conductive elongated recording electrodes which are formed in parallel on each of opposite surfaces of a substrate made of an insulating material such as glass or epoxy resin. As will be seen from a section of the recording head shown in FIG. 8, recording electrodes 2 are formed on opposite surfaces 1*a* and 1*b* of a substrate 1 in such a manner that each electrode 2 on the surface 1*a* confronts a gap between adjacent electrodes 2 on the surface 1*b*. In recording operation, while a recording medium (not shown) making contact with ends of the recording electrodes is moved relative to the recording head substantially orthogonally to the longitudinal direction of the recording electrodes in a direction of arrow x, a series of binary voltage signals representative of an image are applied to the individual recording electrodes to form on the charge holding surface of the recording medium an electrostatic latent image representative of the image which is formed of many dots each having a shape similar to a sectional shape of each recording electrode. In order to obtain a square dot shape, the recording electrode 2 is so formed as to have a substantially square cross-section. For formation of the recording electrodes 2 as above, a thin film of copper is first deposited in a layer on the substrate 1 through, for example by, plating process and the copper thin film is covered with a resist film of a predetermined pattern by using printing technique. The thus prepared substrate structure is then etched so that copper is removed from portions not covered with the resist film and the remaining isolated portions of the copper thin film provide many elongated recording electrodes 2.

Recording electrodes 2 on one surface 1*a* of the substrate 1 are staggered with respect to recording electrodes 2 on the other surface in order to increase the density of dots to be printed. For example, when printing is first carried out along a line on a recording medium with the recording electrodes 2 formed on the one surface 1*a* and thereafter printing is again carried out along the same line with the recording electrodes 2 formed on the other surface 1*b*, the dot density which is twice that obtained by only the recording electrodes 2 on the one surface can be obtained.

When conducting recording by using the recording head as above, a recording paper acting as a recording medium (not shown) is so located as to slidably contact the recording electrodes 2 and an auxiliary electrode (not shown) disposed near the recording electrodes 2. After completion of printing along a line on the recording paper with the recording electrodes 2 formed on one surface 1*a*, the recording paper is moved in the x direction by a distance corresponding to the thickness of the substrate 1 and printing is carried out along the same line with the recording electrodes 2 formed on the other surface 1*b*. Upon completion of recording for the one line, the recording paper is again moved in the x direction and printing for the next line is carried out.

In the conventional electrostatic recording apparatus, recording for one line is carried out by sequentially applying binary signals representative of images to many recording electrodes through multiplexing technique. Thus, in order to print a drawing of, for example, AO size, 14,400 recording electrodes are used, of which 7,200 electrodes are formed on the surface 1*a* of the substrate 1 of FIG. 8 and the remaining 7,200 electrodes are formed on the other surface, 7,200 binary signals are first applied sequentially to the recording electrodes on the surface 1*a* and then 7,200 binary signals are similarly applied sequentially to the recording electrodes on the other surface 1*b*.

In order to make the cross-sectional shape of the recording electrode 2 nearly square, the electrode must have a thickness h of about 80 μm to 120 μm when the electrostatic recording apparatus is to provide a resolution or density of 400 dots/inch. The plating thickness which can be obtained through one cycle of copper plating process is however limited and therefore the thickness of the order mentioned above must be obtained through a plurality of cycles of plating process resulting in low productivity. Further, concurrently with removal of unnecessary copper coating between adjacent recording electrodes 2 through etching process, the side wall of the recording electrode 2 is also etched to form a scrape 3 in the side wall, making it very difficult to shape all the recording electrodes 2 on the substrate 1 into a square form. If any of the recording electrodes 2 on the substrate 1 have scrapes 3 as mentioned above, dots to be recorded are distorted in shape and quality of recording images are degraded disadvantageously.

Further, in order to print a drawing of, for example, AO size, the conventional electrostatic recording apparatus is so designed that about 14,400 recording electrodes 2 for one line are formed on the single substrate 1 and a series of binary signals representative of an image are sequentially applied in series to all of the recording electrodes 2. Therefore, the time required for scanning one line is about 14,400 times the time required for recording one dot. In addition, to meet the application of binary signals, signal lines must be provided individually for the 14,400 recording electrodes 2 with the result that stray capacitance between individual signal lines is increased and besides lengths of signal lines for different electrodes are greatly different from one another, thus adversely affecting quality of recorded images.

SUMMARY OF THE INVENTION

A first object of the present invention is to provide an electrostatic recording apparatus comprising a recording head having a multiplicity of thin strip-like recording electrodes different from square-section electrodes liable to be distorted, and image signal applying means for sequentially applying image signals to the recording electrodes to form on a recording medium an image represented by the image signals by dots such that each recording electrode forms a dot having a substantially square shape based on one image signal applied thereto.

A second object of the invention is to provide an electrostatic recording apparatus wherein in a driver circuit for applying image signals from an image signal source to a multiplicity of recording electrodes of a recording head, lengths of individual signal lines for applying the image signals independently to the respective recording electrodes are made short, and the individual signal lines are sorted into a plurality of groups each having a plurality of signal lines so that an image signal is supplied from the image signal source to corresponding individual signal lines of the respective groups through a common signal line, whereby stray capacitance in the driver circuit is reduced and differences in lengths among the signal lines for applying the image signals to the recording electrodes are decreased to thereby improve quality of images to be recorded on the recording medium and ensure high-speed recording.

According to the first aspect of the present invention, the electrostatic recording apparatus for recording an image represented by a series of binary signals delivered by an image signal source out a recording medium moved relatively to the apparatus, comprises a recording head including a multiplicity of thin strip-shaped recording electrodes having end surfaces substantially aligned on a line substantially perpendicular to a direction of the relative movement of the recording medium, each of the end surfaces having a thickness measured in a direction substantially perpendicular to the line which is smaller than a width measured in a direction parallel to the line, and image signal applying means for sequentially applying a series of binary signals delivered by the image signal source and representative of the image to the multiplicity of recording electrodes to form the image on the recording medium by dots produced thereon correspondingly to the binary signals in such a manner that each of the binary signals is applied at a plurality of times to one of the recording electrodes while moving the recording medium each time relative to the recording head thereby forming one dot corresponding to that binary signal.

According to the second aspect of the present invention, the electrostatic recording apparatus for recording an image represented by a series of binary signals delivered by an image signal source onto a recording medium moved relatively to the apparatus, comprises: a recording head including a multiplicity of elongated recording electrodes having end surfaces substantially aligned on a line substantially perpendicular to a direction of the relative movement of the recording medium, the recording electrodes being sorted into a plurality of electrode groups each of which has a plurality of electrode sets each having a plurality of recording electrodes, and a plurality of auxiliary electrodes provided to the respective electrode sets, each of the auxiliary electrodes being disposed near the end surfaces of recording electrodes of an associated electrode set to confront all of the aligned end surfaces of the recording electrodes; and image signal applying means including a first driver circuit for simultaneously applying a reference voltage having a base level of the binary signals to those auxiliary electrodes which are associated, respectively, with the corresponding electrode sets in the respective electrode groups and applying the reference voltage sequentially to those auxiliary electrodes which are associated with the respective electrode sets included in each electrode group and a second driver circuit provided to each of said electrode groups for simultaneously applying a voltage having a level indicative of the binary signal relative to the reference voltage to the corresponding recording electrodes in the respective electrode sets belonging to the electrode group and applying voltages having levels indicative of the respective binary signals relative to the reference voltage sequentially to the recording electrodes belonging to each electrode set.

DETAILED DESCRIPTION OF THE PREFERRED EMBODIMENTS

Figure 1A:
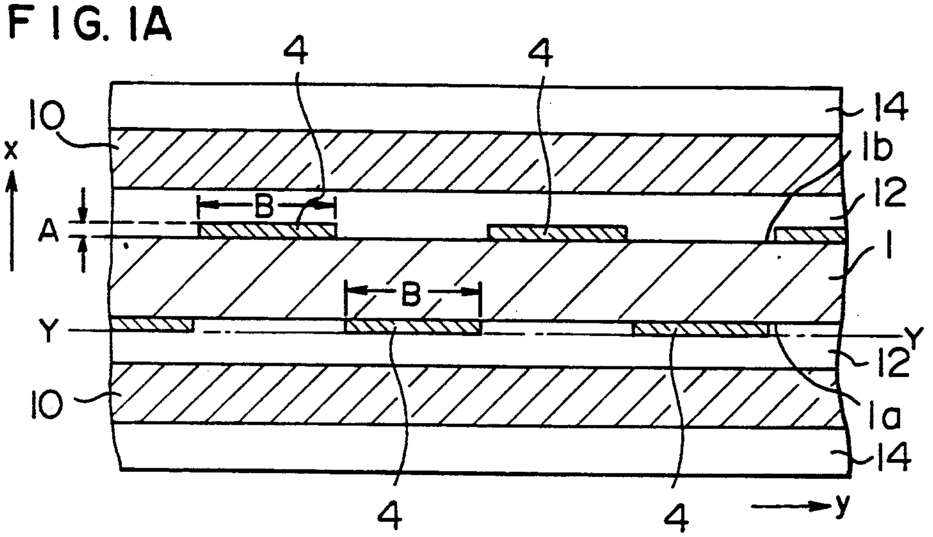
FIG. 1A is a partial sectional view illustrating the end surface, which is in contact, when used, with a recording medium, of a recording head of an electrostatic recording apparatus according to one embodiment of the present invention.
Figure 8:
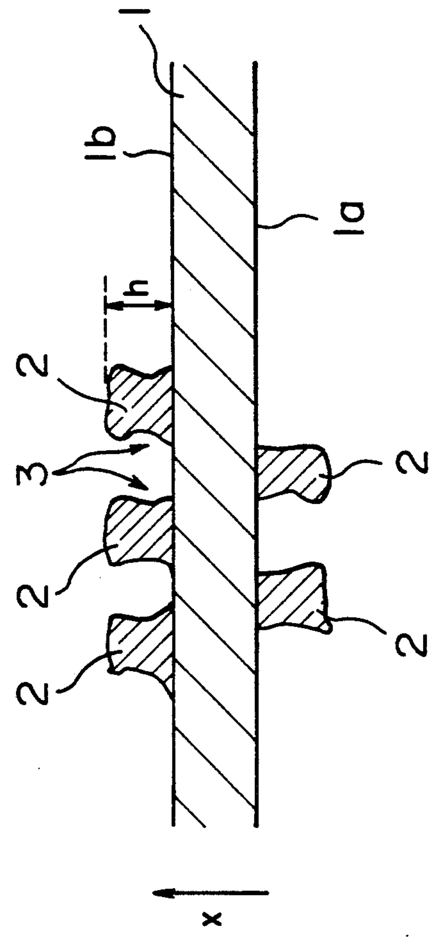
FIG. 8 PRIOR ART
FIG. 8 is a partial sectional view illustrating a prior art recording head.

An embodiment of the invention will now be described with reference to the accompanying drawings. FIG. 1A is a drawing showing part of an end surface, which is, when used, is brought into contact with a recording medium, of a recording head according to the invention. A substrate 1 having a thickness of 30 to 300 μm is made of an insulating material such as glass or epoxy resin and has opposite surfaces 1*a* and 1*b* on which are formed strip-like recording electrodes 4 made of an electrically conductive material and extending in the direction substantially perpendicular to the sheet of the drawing. The recording medium (not shown) is moved in a direction of arrow x while making contact with the end surface of the recording head. The recording electrodes 4 on the surface 1*a* have, end surfaces aligned on a line Y—Y substantially perpendicular to the x direction and each electrode has an x directional length or a thickness A of 1 to 10 μm, for example, 5 μm and a y directional (direction of arrow y) length or a width B of ordinarily 30 to 250 μm which is determined by desired resolution of an image recorded on the recording medium. The electrodes are spaced apart from each other by a distance which is slightly larger than the width B of each electrode. The recording electrodes 4 on the surface 1*b* are positioned to face the spaces between adjacent recording electrodes on the surface 1a and their end surfaces are aligned on a line parallel to the line Y—Y. The recording electrodes 4 on each surface of the substrate are covered with an insulating layer 12 of, for example, epoxy resin and an auxiliary electrode 10 is formed thereon. The auxiliary electrode 10 has a thickness which is selected to be sufficiently larger than the thickness A of the recording electrode and a y directional length which will be described later. The recording electrodes are formed by depositing a thin film of copper on the surface of the substrate 1 to a thickness corresponding to that of the electrodes through a plating process, printing a resist film on the copper thin film in a desired pattern of recording electrodes and etching the copper thin film to remove portions thereof which are not covered with the resist film. Because of the electrode thickness A being 1 to 10 μm, the recording electrodes can be formed through one cycle of plating and etching process, thereby eliminating the prior art disadvantage that the electrode pattern is formed through several cycles of plating and etching process and consequently considerably distorted from a desirable pattern. It should therefore be understood that the thickness of the recording electrodes is so selected as to substantially prevent the electrode pattern formed through plating and etching process from distorting from the desirable pattern. The recording electrodes 4 are formed on the opposite surfaces of the substrate for the same reason as that described in connection with FIG. 8.

Figure 1B:
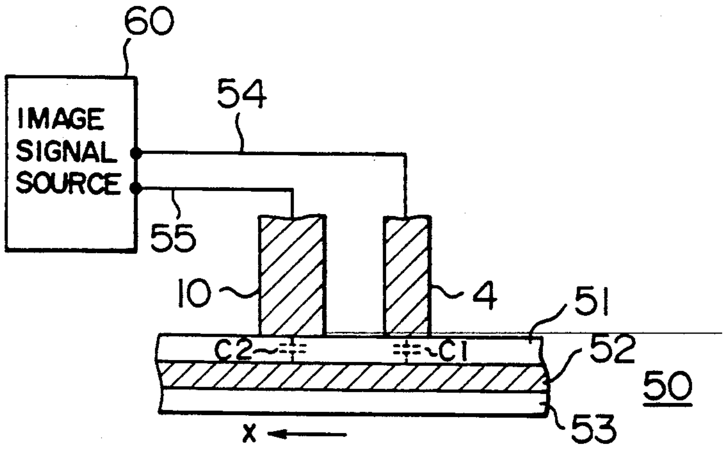
FIG. 1B is a partial diagram showing the positional relation between the recording electrode and auxiliary electrode relative to the recording medium.

The principle of recording images on the recording medium by using the aforementioned recording head will now be described briefly with reference to FIG. 1B. As shown in FIG. 1B, a recording medium generally designated at 50 has an intermediate layer 52 of an electrically conductive material which is sandwiched between layers 51 and 53 of an insulating material and the layer 51 functions as a charge holding surface. When recording, the recording head is positioned such that the end surfaces of the recording electrodes 4, only one of which is shown, and the auxiliary electrode 10 come in contact with the charge holding surface 51 and binary signals representing an image to be recorded are applied from an image signal source 60 such as a computer or an electrographic to the recording electrode and auxiliary electrode through signal lines 54 and 55. The conductive layer 52 is electrically connected to the recording electrode 4 and auxiliary electrode 10 through the insulating layer 51 through capacitive coupling by capacitances C1 and C2. Since the end surface of the auxiliary electrode is sufficiently larger than that of the recording electrode to make C2 far larger than C1, the capacitance C2 can be considered to be of zero resistance for the binary signal and therefore when a binary signal is applied, electric charge depending on the level of the applied binary signal is induced in the form of a dot in the charge holding surface 51 at its area corresponding to the end surface of the recording electrode. The auxiliary electrode may be located opposite to the end surfaces of the recording electrodes while moving the recording medium between the recording electrodes and the auxiliary electrode in contact with the end surfaces of the electrodes. In this case, it is desired to use a recording medium having an additional outer conductive layer at its side which is in contact with the auxiliary electrode so that the capacitance C2 between the auxiliary electrode 10 and the intermediate conductive layer 52 provides substantially zero resistance. By repeating the above operation while the recording medium 50 is moved in the x direction at each repetition, an electrostatic latent image is formed in dot matrix on the charge holding surface 51. By developing the electrostatic latent image with toner, the image is recorded on the charge holding surface.

Figure 2:
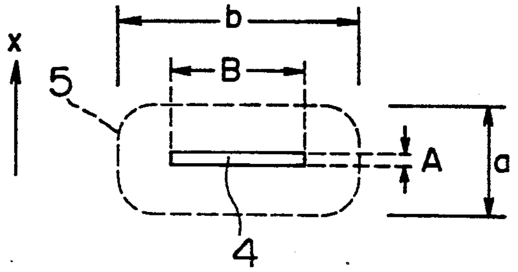
FIG. 2 is a diagram showing the shape of a dot on the recording medium obtained when a voltage signal is applied once to a recording electrode of the recording head of FIG. 1.

Through actual printing using the recording electrode 4 of FIG. 1A, a dot 5 having a shape as shown in FIG. 2 is recorded. The size of the recorded dot 5 is slightly larger than the end surface of the recording electrode 4, having a margin of about 20 to 25 μm. As a result, the dot 5 has an x directional thickness a given by $$a = A + (20 \sim 25)\ \mu m$$

and a width b vertical to the x direction given by $$b = B + (20 \sim 25)\ \mu m.$$

As is clear from FIG. 2, in the dot 5 printed by the recording electrode 4, $b > a$ is held and the shape of the dot is not of a square form which is preferable. However, when printing based on the same binary signal applied to the recording electrode 4 is carried out a plurality of times to obtain a single composite dot, the ultimate dot approximating a square can be obtained.

Figure 3:
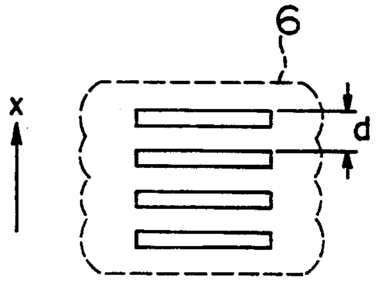
FIG. 3 is a diagram showing the shape of a composite dot on the recording medium obtained when a voltage signal is applied at a plurality of times to a recording electrode of the recording head of FIG. 1.

For example, when printing based on the same binary signal is conducted four times while the recording medium 50 is advanced by a distance d each time that printing is done, a composite dot 6 having a shape as shown in FIG. 3 can be obtained. Assuming that the x directional printing interval d is about 16 μm, the thickness of the recording electrode 4 is 5 μm and the margin is 25 to 30 μm, the composite dot 6 has an x directional thickness of about 80 to 90 μm. On the other hand, when the width B is selected to be 63.5 μm to provide a dot density of 400 dots/inch in the y direction, the composite dot 6 has a y directional width of about 80 to 90 μm given by the sum of the width B and the margin of 25 to 30 μm. Accordingly, by using the recording electrode 4, an ultimate or composite dot of substantially square shape can be obtained from four cycles of printing.

When a single composite dot is formed through four cycles of printing in the manner described previously, the time required for completing printing of the ultimate dot is obviously four times the time for a conventional single dot. Accordingly, if the recording electrodes 4 are provided on the single substrate 1 in the conventional way and a series of binary signals are sequentially applied to all of the recording electrodes 4, the time for printing one line is also quadrupled and the recording speed is decreased. In order to prevent the decrease in recording speed, the recording electrodes 4 and the auxiliary electrodes are interconnected as shown in FIG. 4 and driven in accordance with the present embodiment.

Figure 4:
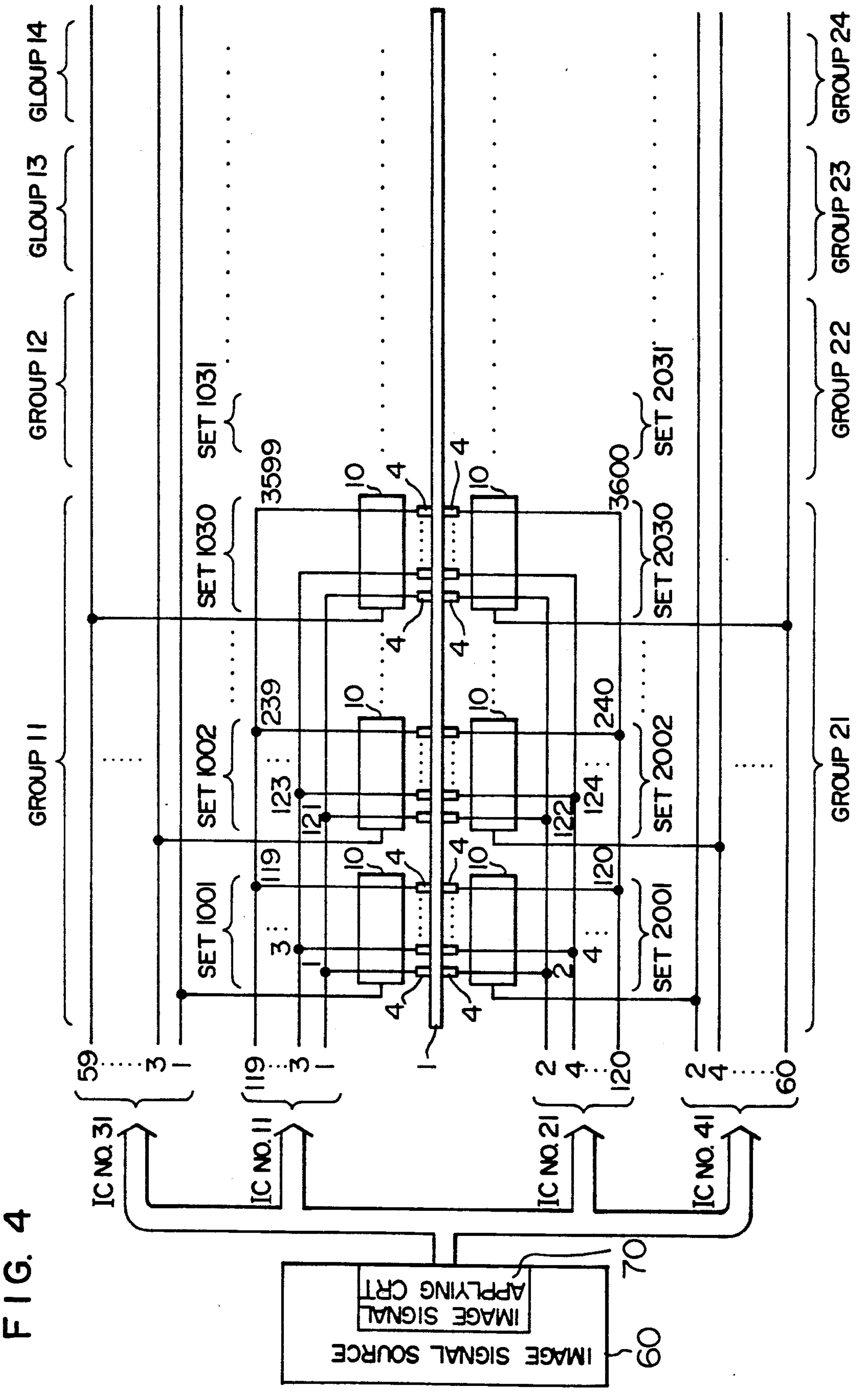
FIG. 4 is a circuit block diagram illustrating the circuit construction of an image applying circuit for applying image signals to the recording head of the invention.

FIG. 4 is a circuit diagram of a drive circuit for the recording electrodes and auxiliary electrodes. Referring to FIG. 4, 14,400 recording electrodes 4 are formed on opposite surfaces of a substrate 1 at constant intervals with electrodes on one surface staggered with respect to those on the other surface. Each recording electrode 4 and the substrate 1 are of the same dimensional configurations as those shown in FIG. 1. The recording electrodes 4 are divided into 8 groups (No. 11 to No. 14 and No. 21 to No. 24) and 1,800 recording electrodes 4 belonging to each group are further divided into 30 sets each having 60 electrodes. Disposed near each set of the recording electrodes 4 is an auxiliary electrode 10 having a y directional length which is so selected as to cause the auxiliary electrode to confront the end surfaces of all recording electrodes of the associated set and being used in common to all the recording electrodes of the associated set.

A second driver circuit includes a plurality of integrated circuits ICs, each IC for driving the recording electrodes 4 of one group is provided near the group on the same substrate 1. For example, an IC No. 11 provided for the group No. 11 has 60 terminals 1, 3, . . . , 119 each of which is connected with 30 corresponding recording electrodes 4 respectively belonging to 30 sets in the group No. 11. Similarly, an IC No. 21 is provided for the group No. 21 and has 60 terminals 2, 4, . . . , 120 each of which is connected with 30 corresponding recording electrodes 4 respectively belonging to 30 sets in the group No. 21. Similar ICs are provided for the remaining groups, respectively.

On the other hand, the auxiliary electrodes 10 are driven by a first driver circuit including a plurality of integrated circuits ICs. More particularly, an IC No. 31 is provided for driving auxiliary electrodes 10 disposed on one surface of the substrate 1 and an IC No. 41 is provided for driving auxiliary electrodes 10 disposed on the other surface of the substrate 1. The IC No. 31 has 30 terminals 1, 3, . . . , 59 each of which is connected with 4 corresponding auxiliary electrodes 10 respectively belonging to the groups No. 11 to No. 14. Similarly, the IC No. 41 has 30 terminals 2, 4, . . . , 60 each of which is connected with 4 corresponding auxiliary electrodes 10 belonging to the groups No. 21 to No. 24.

Figure 5:
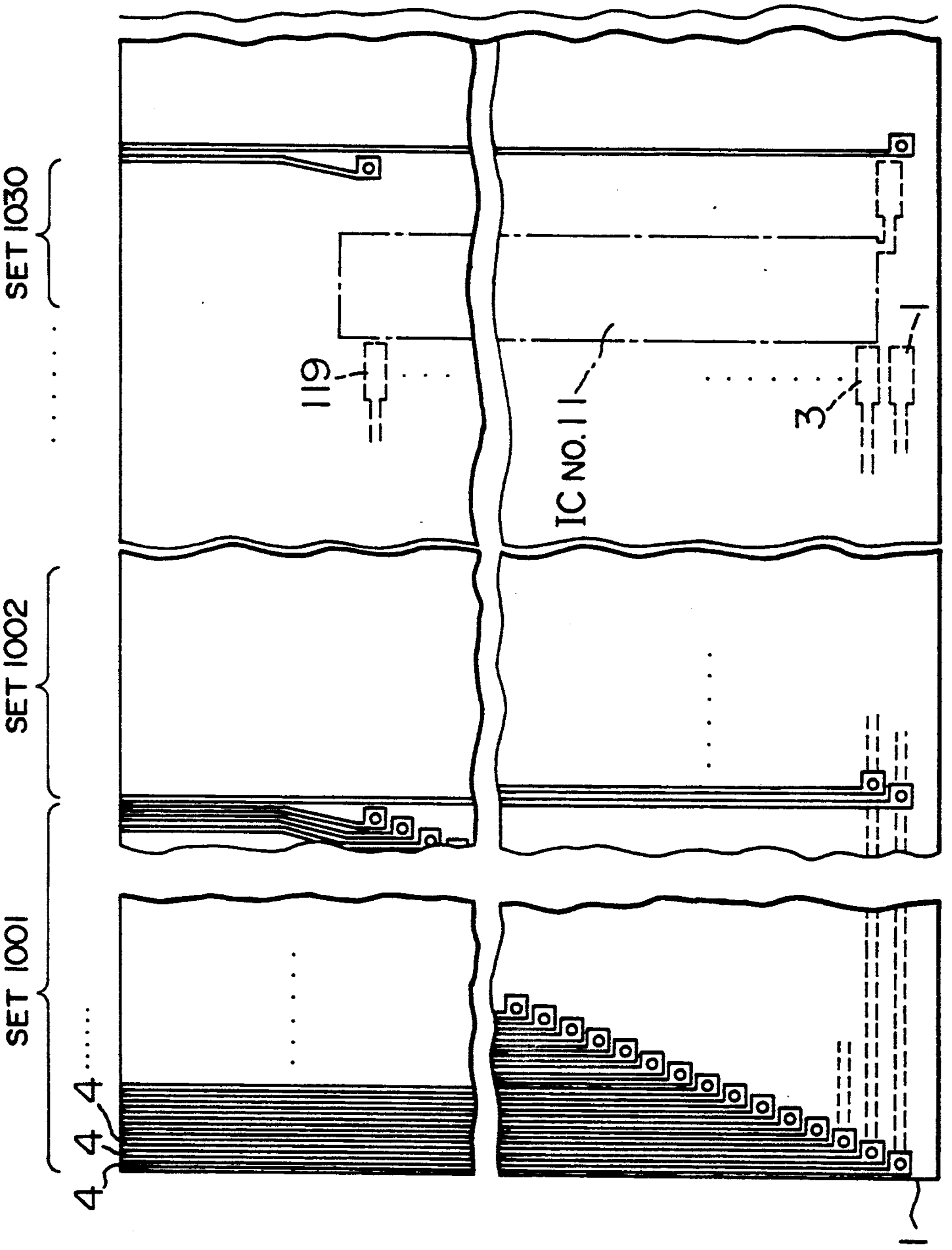
FIG. 5 is a plan view showing a substrate of the recording head of the invention and part of recording electrodes formed on the substrate.

FIG. 5 is a plane view showing part of the substrate 1 on which the recording electrodes 4 are formed. The portion depicted in FIG. 5 corresponds to the group No. 11 in FIG. 4 and as shown therein, the driver IC No. 11 to which the recording electrodes 4 respectively belonging to the sets in this group are connected, is provided on the same substrate 1. A great number of recording electrodes 4 extending vertically on one surface of the substrate 1 are formed thereon simultaneously through plating process and etching process. The IC No. 11 is also mounted on the substrate 1.

Since in the existing typical electrostatic recording apparatus the feeding speed for recording paper is 12.5 mm/sec. and the resolution is 400 dots/inch (15.75 dots/mm), the time required for printing one line is about 5 milliseconds (=1/{12.5 (mm/sec.)×15.75 (dots/mm}). On the other hand it is necessary that for printing with one electrode set in this embodiment, voltage be applied to the one electrode set for at least 10 microseconds, especially, for 40 microseconds for the sake of obtaining high-quality pictures Accordingly, the time required for printing by the electrode sets No. 1001 to No. 1030 of the group No. 11 of FIG. 4 is 40 microseconds×30=1.2 milliseconds.

Since the groups No. 12 to No. 14 are driven simultaneously with the group No. 11 in the same way, the above printing time equals the time required for one cycle of printing of one line. Therefore, the time required for printing four times as shown in FIG. 3 is obtained by quadrupling the time for one line by one cycle printing time and it measures 4.8 milliseconds which falls within the 5 milliseconds.

Figure 6:
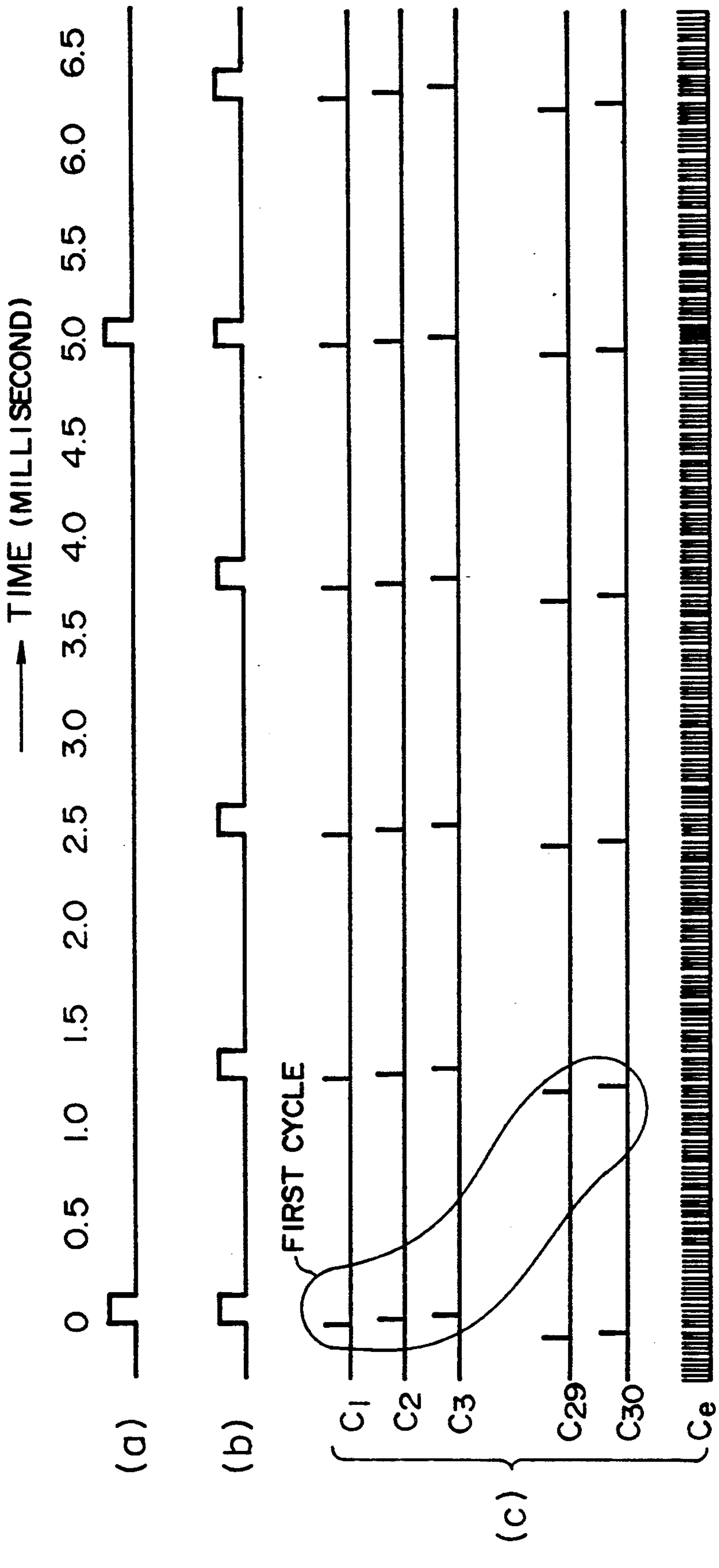
FIGS. 6 and 7 are timing charts showing timings for application of voltages to the recording electrodes and the auxiliary electrode.

FIG. 6 is a timing chart showing operation timings in the driver circuits shown in FIG. 4. Illustrated in FIG. 6(*a*) is a one line synchronizing signal in which a pulse generates at a period of about 5 milliseconds to define a start point for printing of one line (4 cycles of printing). Illustrated in FIG. 6(*b*) is a scan synchronizing signal which defines a start point for each cycle of printing. Specifically, about 1.2 milliseconds is required for one cycle of printing and four pulses are generated within one period of the one line synchronizing signal shown in FIG. 6(*a*). Illustrated in FIG. 6(*c*) are auxiliary electrode scan synchronizing signals. Specifically, when an output enable signal as designated at Ce is applied to a driver circuit for auxiliary electrode (for example, IC No. 31 or IC No. 41 in FIG. 4), the driver runs in synchronism with this enable signal to sequentially apply a reference voltage having a base level of binary signals representing an image to be printed to the auxiliary electrodes connected to the 30 terminals of the driver IC at timings C1 to C30 as shown.

Figure 7:
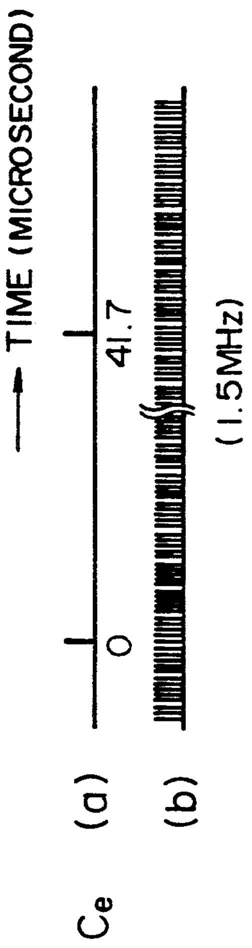

The output enable signal Ce shown in FIG. 6(*c*) is depicted exaggeratedly in FIG. 7(*a*) and the timing for sequential application of binary signals to the driver IC for recording electrodes is shown in FIG. 7(*b*). The reference voltage is applied sequentially to auxiliary electrodes to timings of FIG. 7(*a*) and recording or binary voltages are applied sequentially to recording electrodes associated with the auxiliary electrode at timings of FIG. 7(*b*) during one period in FIG. 7(*a*). In this case, the recording voltage is so selected as to have a level relative to the reference voltage corresponding to a binary signal representative of an image to be printed by a recording electrode. As indicated in FIG. 7(*a*), a pulse generates at a period of 41.7 microseconds in the output enable signal Ce and within this period, binary signal voltages representative of recording image are applied sequentially to 60 recording electrodes 4 belonging to one electrode set. Therefore, the frequency of the pulse signal shown in FIG. 7(*b*) is about 1.5 MHz. A circuit 70 for applying a series of binary signals representative of an image to the individual recording electrodes in the manner as above-mentioned may be constituted in the form of software in a computer operating as the image signal source 60 or otherwise may be constituted as a separate circuit.

In the present embodiment, the electrodes for one line are sorted into 8 groups (4 groups of electrodes on one surface and 4 groups of electrodes on the other surface) and printing for one line is completed through 4 cycles of printing, thereby ensuring that quality of recording images can be improved while maintaining the recording speed corresponding to that in the conventional apparatus.

In the foregoing embodiment, the thickness of the recording electrode is described as being 5 μm but it may be less than 5 μm. In this case, the number of cycles of printing may be determined in accordance with the thickness so that the shape of one composite dot may approximately a square. It will be appreciated that even the recording electrodes in the conventional apparatus may be sorted into sets and signal voltages may be applied to individual electrode sets, whereby stray capacitance can be reduced to improve the quality of recording images and the recording speed. The thinner the recording electrode, the more the shape of one ultimate dot approximates a square to improve the quality of recording images.

According to the invention, the thickness of the recording electrode can be reduced and a plurality of cycles of plating process as required conventionally for formation of the recording electrodes can be eliminated, thereby ensuring that the necessary thickness for the recording electrode can be obtained through one cycle of plating process to improve producibility and reduce production cost. Further, the recording electrode being small in thickness is less scraped in course of etching to permit the shape of a composite dot obtained through a plurality of cycles of printing to approximately a square to thereby improve recording quality. In addition, in spite of the fact that the time required for printing one ultimate dot is prolonged as compared to that in the conventional apparatus, the recording speed can be maintained at that of the conventional apparatus by printing the individual electrode groups in parallel and besides the stray capacitance can be reduced, whereby the recording quality can be improved in the electrostatic recording apparatus.

Furthermore, recording for one line is carried out by using the recording electrode divided into the individual electrode groups so that the time required for recording one line can be reduced considerably in proportion to the number of the electrode groups to contribute to improvement in the whole recording speed, and the driver circuit for applying voltages to the recording electrodes is provided in association with each electrode group so that the wiring distance between the driver circuit and each recording electrode can be decreased to mitigate the degradation of recording quality due to stray capacitance.

We claim:

1. An electrostatic recording apparatus for recording an image represented by a series of binary signals delivered by an image signal source onto a recording medium which is moved relatively to the apparatus, said apparatus comprising:

a recording head including a plurality of thin strip-shaped recording electrodes having end surfaces substantially aligned on a line substantially perpendicular to a direction of the relative movement of said recording medium, each of said end surfaces having a thickness measured in a direction substantially perpendicular to said line which is smaller than a width measured in a direction parallel to said line;

image signal applying means for applying a series of binary signals, delivered by said image source and representative of the image, sequentially to said plurality of recording electrodes to form the image on the recording medium by dots produced thereon correspondingly to the binary signals in such a manner that each of the binary signals is applied equally at a plurality of times to each of the recording electrodes while moving the recording medium in the same one direction with respect to the recording head thereby forming one dot corresponding to that binary signal; and wherein said recording medium is advanced relative to the recording head by a predetermined distance during a time interval between successive two applications of the binary signal to the one recording electrode, said predetermined distance being selected such that latent images, which are produced on the recording medium by successive two applications of the binary signal, and each of which is larger in size than the end surface of the recording electrode, overlap with each other whereby the one dot formed from the latent images produced by the application of the binary signal at the plurality of times is obtained having a substantially square shape.

2. An electrostatic recording apparatus according to claim 10 wherein the width of said end surface measured in a direction parallel to said line is determined by resolution of the image to be printed, and the thickness of said end surface measured in a direction substantially perpendicular to said line is selected to be sufficiently thin for preventing substantial distortion in dimension of said width when said recording electrode is formed through an etching process.

3. An electrostatic recording apparatus according to claim 10 wherein said recording electrode has a thickness of about 1 to 10 $\mu$m and a width of about 30 to 250 $\mu$m.

4. An electrostatic recording apparatus according to claim 1 wherein the number of applications of said each binary signal to the one recording electrode is so selected as to provide the dot as multiplication product of the number of applications, and a sum of the thickness of the end surface of the recording electrode and a value a, where the value a is a margin of the latent image produced by one application of the binary signal to the one recording electrode extending outwardly of the end surface of the recording electrode and being in a range of 20 to 25 $\mu$m.

* * * * *